US012389315B2

(12) United States Patent
Garcia Azorero et al.

(10) Patent No.: US 12,389,315 B2
(45) Date of Patent: *Aug. 12, 2025

(54) NETWORK SLICE SELECTION (71) Applicant: Telefonaktiebolaget LM Ericsson (publ), Stockholm (SE)

(72) Inventors: Fuencisla Garcia Azorero, Madrid (ES); Susana Fernandez Alonso, Madrid (ES); Victor Ferraro Esparza, Valencia (ES); Angel Navas Cornejo, Leganes (ES); Ignacio Rivas Molina, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 18 days.

This patent is subject to a terminal disclaimer.

(21) Appl. No.: 18/403,160

(22) Filed: Jan. 3, 2024

(65) Prior Publication Data

US 2024/0137854 A1  Apr. 25, 2024

Related U.S. Application Data

(63) Continuation of application No. 17/746,502, filed on May 17, 2022, now Pat. No. 11,871,340, which is a
(Continued)

(51) Int. Cl.
*H04W 48/18* (2009.01)
*H04W 4/18* (2009.01)
(Continued)

(52) U.S. Cl.
CPC ............ *H04W 48/18* (2013.01); *H04W 4/18* (2013.01); *H04W 8/08* (2013.01); *H04W 12/06* (2013.01); *H04W 80/10* (2013.01)

(58) Field of Classification Search
CPC ......... H04W 48/18; H04W 4/18; H04W 8/08; H04W 12/06; H04W 80/10
See application file for complete search history.

(56) References Cited

U.S. PATENT DOCUMENTS 10,142,994 B2  11/2018  Lee et al.
10,652,809 B2   5/2020  Xu et al.
(Continued)

FOREIGN PATENT DOCUMENTS

WO     2016192639 A1    12/2016

OTHER PUBLICATIONS

International Search Report and Written Opinion Dated Sep. 27, 2017, for International Application No. PCT/EP2016/082939 filed on Dec. 30, 2016, consisting of 9 pages.
(Continued)

*Primary Examiner* — Won Tae C Kim
(74) *Attorney, Agent, or Firm* — Weisberg I.P. Law, P.A.

(57) ABSTRACT

Network nodes and methods for control thereof for dynamic network slice selection. An AMF receives a UE request originating from the UE, the UE request being any one of a registration request and a session request. A network slice requester controls a transmitter to transmit a network slice selection request to a PC_NSS. A selection data manager of the PC_NSS determines selection data specifying one or more UE specific parameters affecting network slice selection. A network slice selector selects a network slice assignable for the UE, based on the selection data, determines network slice data and a corresponding network slice routing rule, and transmits them to the AMF. A network slice manager of the AMF controls assignment of a network slice to the UE in dependence on the received network slice data and network slice routing rule.

10 Claims, 5 Drawing Sheets

Related U.S. Application Data continuation of application No. 16/466,865, filed as application No. PCT/EP2016/082939 on Dec. 30, 2016, now Pat. No. 11,363,524.

(51) Int. Cl.
*H04W 8/08* (2009.01)
*H04W 12/06* (2021.01)
*H04W 80/10* (2009.01)

(56) References Cited

U.S. PATENT DOCUMENTS

| | | | |
|---|---|---|---|
| 11,871,340 B2* | 1/2024 | Garcia Azorero | H04W 48/18 |
| 2015/0156692 A1* | 6/2015 | Kim | H04W 64/00 455/436 |
| 2016/0353367 A1 | 1/2016 | Vrzic et al. | |
| 2017/0142591 A1 | 5/2017 | Vrzic | |
| 2017/0303259 A1 | 10/2017 | Lee et al. | |
| 2017/0339688 A1 | 11/2017 | Singh et al. | |
| 2018/0176858 A1* | 6/2018 | Wang | H04W 76/12 |
| 2018/0324576 A1 | 11/2018 | Salkintzis | |
| 2019/0124508 A1 | 4/2019 | Watfa et al. | |
| 2019/0174321 A1 | 6/2019 | Sun et al. | |
| 2020/0059989 A1 | 2/2020 | Velev et al. | |

OTHER PUBLICATIONS

3GPP TR 23.799 V14.0.0; 3rd Generation Partnership Project; Technical Specification Group Services and System Aspects; Study on Architecture for Next Generation System (Release 14); Dec. 2016, consisting of 522 pages.

3GPP TSG SA Meeting #74 SP-160829; Title: Presentation of TR 23.799: Study on Architecture for Next Generation System (Release 14) for Approval; Source: SA WG2; Document for: Approval; Agenda Item: 16B.1; Location and Date: Vienna, Austria, Dec. 7-9, 2019, consisting of 524 pages.

Indian Examination Report dated Oct. 28, 2020 issued in Indian Patent Application No. 201917023010, consisting of 7 pages.

* cited by examiner

PRIOR ART

Fig. 2b

PRIOR ART

NETWORK SLICE SELECTION

CROSS-REFERENCE TO RELATED APPLICATIONS

This application is a continuation of U.S. application Ser. No. 17/746,502, filed May 17, 2022, entitled "NETWORK SELECTION", which is a continuation of U.S. application Ser. No. 16/466,865, now U.S. Pat. No. 11,363,524, filed Jun. 5, 2019, entitled "NETWORK SLICE SELECTION", which claims priority to International Application No. PCT/EP2016/082939, filed Dec. 30, 2016, entitled "NETWORK SLICE SELECTION", the entireties of all of which are incorporated herein by reference.

TECHNICAL FIELD

The invention relates to the selection of network slices in a telecommunications network for use by a User Equipment (UE). Specifically, exemplary methods and apparatus relate to dynamic selection of network slices in a telecommunications network.

INTRODUCTION

A network slice is a logical network serving a defined business (or network) purpose or a specific customer. A network slice includes all the required network resources to put the network slice into effect and is created, changed and removed by management functions within the telecommunications network.

A network slice is complete in the context of that network or end-to-end purpose, i.e. they are and behave like networks in their own right, including all the required capabilities and resources. This extends all the way from the share of the infrastructure resources, through configured network functions to network management or even Operation Support Systems (OSS) and/or Business Support System (BSS) capabilities and encompasses both mobile and fixed network access.

Just as existing networks are built to realize services, so are network slices. Network slices are not services in themselves, but they are built to realize one or several services. As a special case, a service (or instance thereof) may map one-to-one with a network slice, allowing, for example, wholesale type services. For the sake of clarity, the term 'service' may represent a generic service, e.g. an Online Banking service, whereas the term 'service instance' may represent a specific service, such as e.g. an Online Banking service in a specific bank or even a specific transaction carried out in an Online Banking.

As slices can be created to address a new business or network requirement or customer and may need to adapt to changes, they require new types of life cycle management functions, which have the role of creating, changing (e.g. upgrading) or removing network slices.

Network slicing is a relatively new paradigm or way of viewing and designing the end-to-end provider network.

The Third Generation Partnership Project (3GPP) standard is currently defining a new system architecture for next generation mobile networks that will be the next major phase of mobile telecommunication standards beyond the current $4^{th}$ Generation (4G). The new architecture is being studied in the 3GPP TR 23.799 and an exemplary architecture discussed in 3GPP TR 23.799, for a non-roaming scenario, can be seen in FIG. 1.

Figure 1:
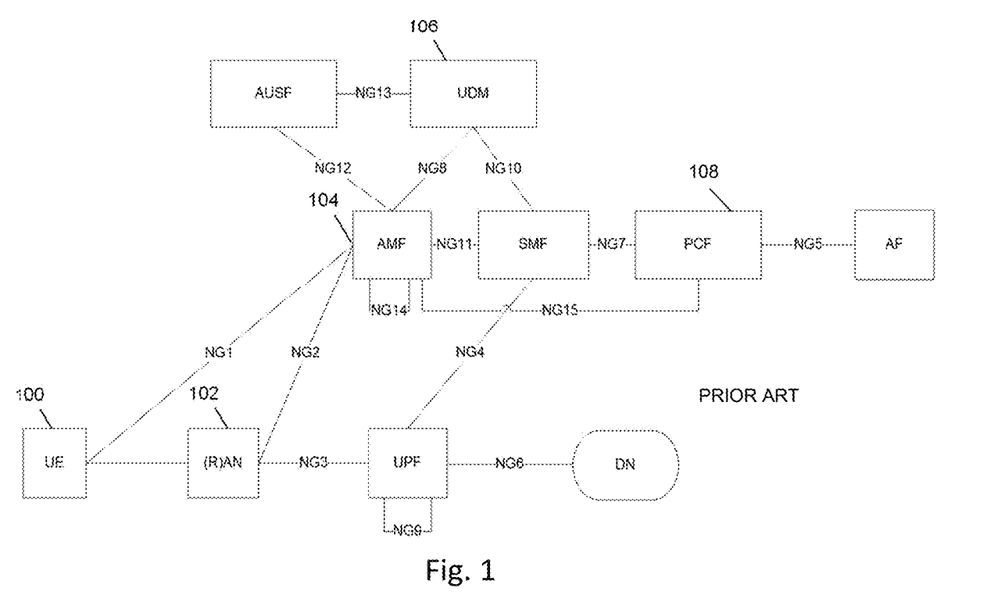
FIG. 1 is a block schematic representation of an exemplary telecommunications network.

The architecture shown in FIG. 1 includes the logical entities (or network functions) that will replace/evolve from the current 4G defined logical entities. For example, the mobility management tasks currently being performed by the Mobility Management Entity (MME) will be assumed by the Next Generation Access and Mobility Management Function (AMF, or MMF) plus additional tasks required in a 5G evolved network. In a similar way, the Packet Data Network Gateway (PGW) responsibilities can be assumed by the Next Generation Session Management Function (SMF, or SMF) and Next Generation Core User Plane (UP) functions in addition to new functionality required in a 5G evolved network.

The roles of the logical entities in FIG. 1 and the associated interfaces are being studied and defined in the 3GPP TR 23.799. It is noted that the terminology is being adapted during the development of 3GPP TR 23.799. Accordingly, within the scope of this document the entities "MMF" and "AMF" might be considered equivalent. In a similar way, the entities "SDM" and "UDM" might be considered equivalent. The requirements that the architecture must fulfill are described in clause 4.1 of TR 23.799. One of the defined requirements relates to "Network Slicing".

Network slicing enables the operator of a network to create networks customized to provide optimized solutions for different market or network scenarios which demand diverse requirements, e.g. in the areas of functionality, performance and isolation. The network slice is thus a logical representation of Network Functions (NF) and their corresponding resource requirements necessary to provide the required telecommunication services and network capabilities within their responsibility.

The 3GPP specified, in Release 13, the support of multiple Dedicated Core Networks (DCN) within a Public Land Mobile Network (PLMN), each of these DCNs including one or a plurality of Core Network Nodes. Each DCN may be dedicated to serving specific types of subscribers and for different motivations, e.g. to provide DCNs with specific characteristics/functions for scaling, to isolate specific UEs or subscribers (e.g. Machine-to-Machine (M2M) characteristics/functions or scaling, subscribers belonging to a specific enterprise or separate administrative domain, etc.). Further information on this is included in 3GPP TS 23.401. Herein, when we refer to a "CN Instance" this term encompasses a DCN.

3GPP TR 23.799 identifies different alternatives to cope with network slicing and how they relate to CN Instances (see clause 6.1 and Annex D). According to the studied proposals, there can be common Network Functions that apply to every network slice and specific Network Functions that are applicable in the context of a network slice.

Figure 2A:
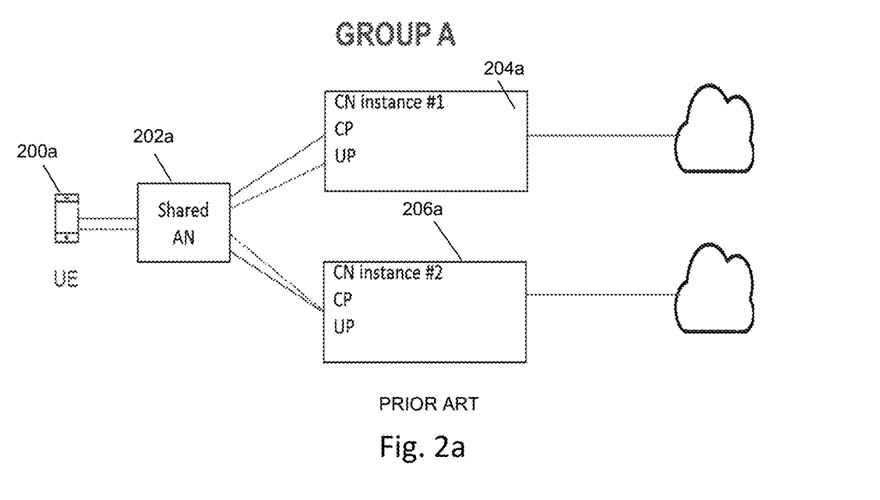
FIGS. 2a-c show block schematic representations, each of a group of network slicing configurations.

In order to realize network slicing, 3GPP TR 23.799 14.0.0, Annex D, defines three groups of solutions for the support of multiple network slices per UE:

Group A, represented in FIG. 2a and where a UE 200a obtains services through a shared access network 202a and from different network slices 204a, 206a and different CN instances, each CN instance containing all the NFs required for the service. This group is characterized by independent subscription management/mobility management for each network slice.

Figure 2B:
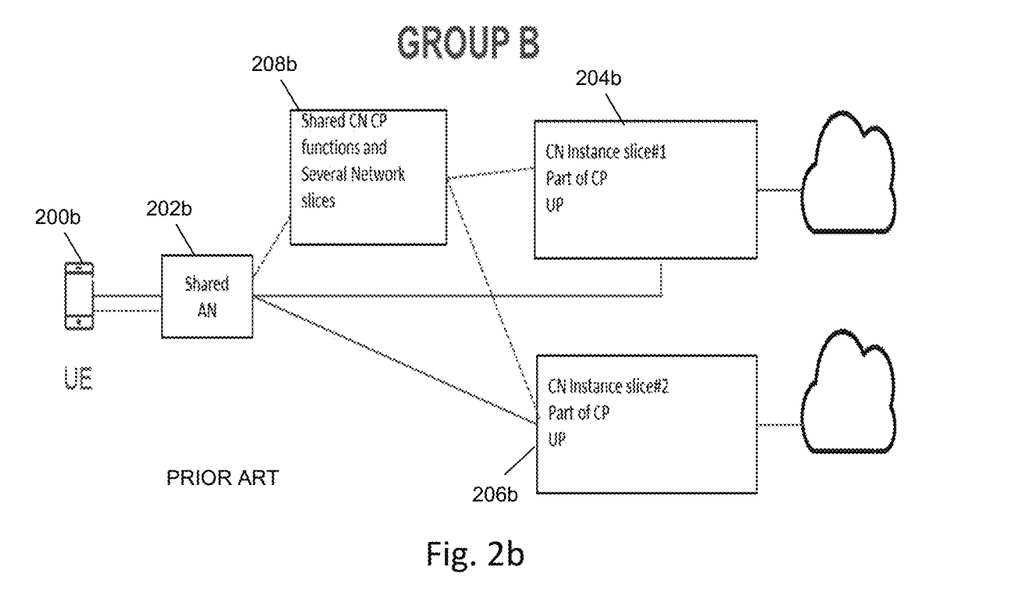

Group B, represented in FIG. 2b and in which a UE 200b obtains services through a shared access network 202b and from different network slices 204b, 206b, but that assumes some NFs 208b are common between the network slices, while other functions reside in their individual network slices 204b, 206b.

Figure 2C:
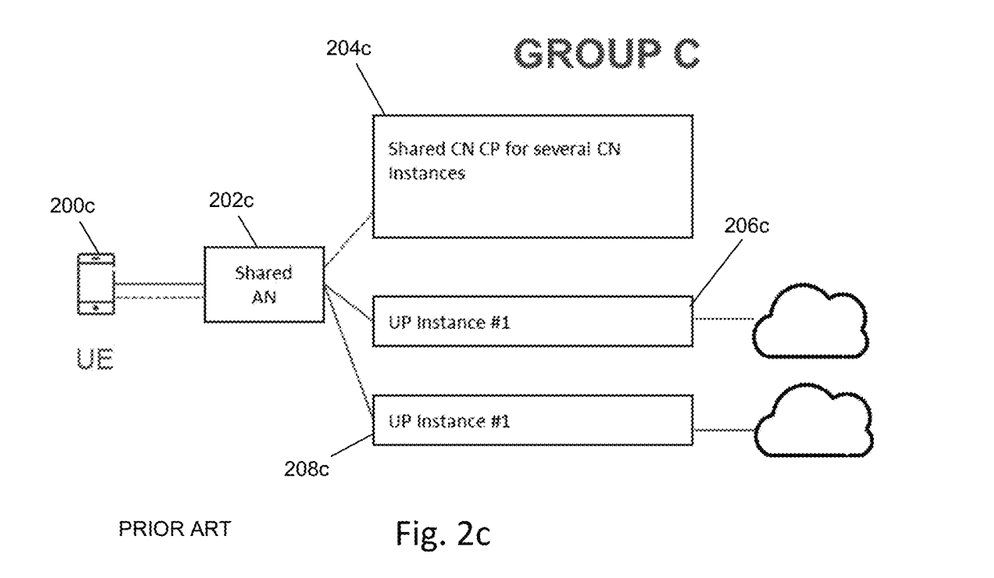

Group C, represented in FIG. 2c and in which a UE 200c obtains services through a shared access network 202c and assumes that the control plane 204c handling is common between the slices, while the user plane(s) 206c, 208c are handled as different network slices.

According to the agreements reached at the time of writing, Group B type is the preferred solution. Group C is considered subsumed under Group B. Group A is likely not to be pursued.

According to the current procedures defined in 3GPP TR 23.799, a Network Slice Selection function (NSSF) is responsible for selecting a network slice for a UE and is only aware of the network slice identity allocated to a UE, the subscription information for the user of the UE and local policies. Based on that information, it could be possible according to some of the solutions described in 3GPP TR 23.799 to reselect another network slice for a UE if network or other conditions change. The network slice identity known by the NSSF may be mapped into the applicable NFs that form the network slice based on configuration.

This type of solution is very sensitive to changes (e.g. the definition of a new network slice, or the redefinition of the existing one). As the number of network slices grows, a large computational overhead is required for configuration of the NFs and the possibility of changing entities in a dynamic way is reduced. The NFs would need to know: whether they are common NFs or if they are network slice specific NFs; the set of network slices they are to be used within; and, in order to route PDU session establishment and Protocol Data Unit (PDU) session establishment, the set of NFs to be used in each network slice.

The selection of network slices can be performed as part of different procedures, e.g. during attach and at PDU session establishment. The following list includes some examples of use cases that would be limited or be highly impacted with the current proposed solutions due to the limitations in the way network slices are being defined:

- Allocating heavy users to a specific network slice where they compete for resources with other heavy users.
- Allocating high signalling load terminals (malfunctioning terminals) to a specific network slice where they compete for resources with other high signalling load terminals.
- Allocating different network slices for different services (e.g. Voice Over Long Term Evolution (VoLTE) and Mobile Broadband (MBB)) or for a same service, e.g. VoLTE, depending on additional criteria such as, for example, location, time of day, congestion situation etc.

According to current solutions, the UE, the NFs and the NSSF need to know how to treat the network slice identifier. This identifier should have information (or refer to that information) related to the entities that form the network slice and how to address each of them (when other information included in the UE request such as, for example, the Access Point Name (APN), is not enough). This information is statically configured in the affected logical entities, making the use cases described above quite static, and badly scalable, as all the decisions related to the network slice definition need to be taken in advance.

SUMMARY

The inventors have realised that the market for telecommunications networks will evolve and network operators will demand more flexibility and adaptability to the network to implement their and their partners' business goals. In this short-medium term context, the inventors have appreciated that the implementation of efficient mechanisms that allow the dynamic allocation of a UE to different network slices provides an attractive enabler for the dynamic creation and availability of network slices based on changing conditions.

The inventors have appreciated that current mechanisms do not consider that a reselection of the network slice can be required in a dynamic way (e.g. considering measured conditions under which the service the UE is accessing is being delivered).

According to an aspect of the invention, there is provided a network node configured for use as an Access and Mobility Management Function, AMF, of a telecommunications network, the AMF for controlling network slice assignment to a user equipment, UE, within the telecommunications network. The network node comprises a receiving means, which may be a receiver, configured to receive a UE request originating from the UE, the UE request being any one of a registration request and a session request. The network node comprises a network slice requesting means, which may be a network slice requester, configured to control a transmitter to transmit a network slice selection request to a Policy Control Network Slice Selection function, PC_NSS. The receiver is configured to receive, from the PC_NSS, network slice data identifying a network slice assignable for the UE, and a corresponding network slice routing rule identifying the assignable network slice and a set of network functions forming the assignable network slice. The network node comprises a network slice managing means, which may be a network slice manager, configured to control assignment of a network slice to the UE in dependence on the received network slice data and network slice routing rule.

In particular, the registration request may correspond to, for example, an access request or a UE request for network connection during an attach procedure. Also in particular, the session request may correspond to e.g. a UE request for establishment of a PDU session.

Optionally, the network slice manager is configured to determine whether the assignable network slice identified by the received network slice data is supported by the AMF, and further configured: if the assignable network slice is not supported by the AMF, to control the transmitter to transmit the UE request to a further AMF for control of assignment of a network slice for the UE; and if the assignable network slice is supported by the AMF, to assign the assignable network slice for the UE.

Optionally, the network slice data received via the receiver comprises an authorized network slice selection assistance information, NSSAI, representing one or more assignable network slices for the UE, and respectively corresponding one or more network slice routing rules.

Optionally, each network slice routing rule further identifies a service scope at which the assignable network slice applies, wherein the service scope indicates any one of: a service, a service in a packet data network, PDN, and a service data flow in a PDN.

Optionally, the network slice manager is configured to determine an applicable network slice to be assigned for the UE, amongst the one or more assignable network slices, based on the service scope identified by each network slice routing rule.

Optionally, the receiver is further configured to receive a UE-provided NSSAI along with the UE request.

Optionally, the network slice manager is configured, if the UE-provided NSSAI matches the authorized NSSAI, to enforce the network slice routing rule for the UE-provided NSSAI or, if the UE-provided NSSAI does not match the authorized NSSAI, to enforce the network slice routing rule for the authorized NSSAI.

Optionally, the network slice routing rule further comprises data indicating one or more conditions and/or events specifying when a further network slice selection request should be transmitted to the PC_NSS.

Optionally, upon the receiver receiving a further UE request originating from the UE, the network slice requester is configured to determine whether one or more of the conditions and/or events has occurred, and, if so, to control the transmitter to transmit a further network slice selection request to the PC_NSS.

Optionally, the network slice manager is configured to control the transmitter to transmit the data indicating one or more conditions and/or events to a Session Management Function, SMF.

According to an aspect of the invention, there is provided a method for controlling a network node configured for use as an Access and Mobility Management Function, AMF, of a telecommunications network, the AMF for controlling network slice assignment to a user equipment, UE, within the telecommunications network. The method comprises receiving, by a receiver, a UE request originating from the UE, the UE request being any one of a registration request and a session request. The method comprises controlling a transmitter, by a network slice requester, to transmit a network slice selection request to a Policy Control Network Slice Selection function, PC_NSS. The method comprises receiving, by the receiver from the PC_NSS, network slice data identifying a network slice assignable for the UE, and a corresponding network slice routing rule identifying the assignable network slice and a set of network functions forming the assignable network slice. The method comprises controlling, by a network slice manager, assignment of a network slice to the UE in dependence on the received network slice data and network slice routing rule.

Optionally, the method further comprises determining, by the network slice manager, whether the assignable network slice identified by the received network slice data is supported by the AMF: if the assignable network slice is not supported by the AMF, the network slice manager controlling the transmitter to transmit the UE request to a further AMF for control of assignment of a network slice for the UE; and if the assignable network slice is supported by the AMF, the network slice manager assigning the assignable network slice for the UE.

Optionally, the network slice data received via the receiver comprises an authorized network slice selection assistance information, NSSAI, representing one or more assignable network slices for the UE, and respectively corresponding one or more network slice routing rules.

Optionally, each network slice routing rule further identifies a service scope at which the assignable network slice applies, wherein the service scope indicates any one of: a service, a service in a packet data network, PDN, and a service data flow in a PDN.

Optionally, the method further comprises determining, by the network slice manager, an applicable network slice to be assigned for the UE, amongst the one or more assignable network slices, based on the service scope identified by each network slice routing rule.

Optionally, the method further comprises receiving, by the receiver, a UE-provided NSSAI along with the UE request.

Optionally, the method further comprises, if the UE-provided NSSAI matches the authorized NSSAI, enforcing by the network slice manager (318) the network slice routing rule for the UE-provided NSSAI or, if the UE-provided NSSAI does not match the authorized NSSAI, enforcing by the network slice manager the network slice routing rule for the authorized NSSAI.

Optionally, the network slice routing rule further comprises data indicating one or more conditions and/or events specifying when a further network slice selection request should be transmitted to the PC_NSS.

Optionally, upon the receiver receiving a further UE request originating from the UE, the method further comprises determining, by the network slice requester, whether one or more of the conditions and/or events has occurred, and, if so, controlling the transmitter to transmit a further network slice selection request to the PC_NSS.

Optionally, the method further comprises controlling, by the network slice manager, the transmitter to transmit the data indicating one or more conditions and/or events to a Session Management Function, SMF.

According to an aspect of the invention, there is provided a network node configured for use as a Policy Control Network Selection function, PC_NSS, of a telecommunications network, the PC_NSS for selecting one or more network slices assignable for a UE within the telecommunications network. The network node comprises a receiving means, which may be a receiver, configured to receive a network slice selection request from an Access and Mobility Management Function, AMF. The network node comprises a selection data managing means, which may be a selection data manager, configured to determine selection data specifying one or more UE specific parameters affecting network slice selection. The network node comprises a network slice selecting means, which may be a network slice selector, configured to select a network slice assignable for the UE, based on the selection data, and to determine network slice data identifying the assignable network slice and a corresponding network slice routing rule identifying the assignable network slice and a set of network functions forming the assignable network slice. The network slice selector is further configured to control a transmitter to transmit to the AMF the network slice data and the corresponding network slice routing rule for controlling assignment of a network slice for the UE based on the network slice data and network slice routing rule.

Optionally, the network slice data transmitted via the transmitter comprises an authorized network slice selection assistance information, NSSAI, representing one or more assignable network slices for the UE, and respectively corresponding one or more network slice routing rules.

Optionally, each network slice routing rule further comprises a service scope at which the assignable network slide applies, wherein the service scope indicates any one of: a service, a service in a packet data network, PDN, and a service data flow in a PDN.

Optionally, the network slice routing rule further comprises data indicating one or more conditions and/or events specifying when a further network slice selection request should be transmitted to the PC_NSS.

Optionally, the network slice selector is further configured to control the transmitter to transmit to the AMF redirect data for redirecting assignment of the network slice for the UE to a further AMF, and wherein the network slice selector is configured to determine the redirect data based on whether the assignable network slice is supported by the AMF.

Optionally, the selection data manager is configured to determine at least part of the selection data by controlling the transmitter to transmit one or more selection data requests to one or more further network nodes in the telecommunications network, and wherein the receiver is configured to receive the selection data from the one or more further network nodes.

Optionally, the selection data further comprises: network slice data comprising one or more network slice attributes affecting network slice selection, the time of day and/or one or more network operator specified conditions.

According to an aspect of the invention, there is provided a method for controlling a network node configured for use as a Policy Control Network Selection function, PC_NSS, of a telecommunications network, the PC_NSS for selecting one or more network slices assignable for a UE within the telecommunications network. The method comprises receiving, by a receiver, a network slice selection request from an Access and Mobility Management Function, AMF. The method comprises determining, by a selection data manager, selection data specifying one or more UE specific parameters affecting network slice selection. The method comprises selecting, by a network slice selector, a network slice assignable for the UE, based on the selection data, and determining, by the network slice selector, network slice data identifying the assignable network slice and a corresponding network slice routing rule identifying the assignable network slice and a set of network functions forming the assignable network slice. The method comprises controlling a transmitter, by the network slice selector, to transmit to the AMF the network slice data and the corresponding network slice routing rule for controlling assignment of a network slice for the UE based on the network slice data and network slice routing rule.

Optionally, the network slice data transmitted via the transmitter comprises an authorized network slice selection assistance information, NSSAI, representing one or more assignable network slices for the UE, and respectively corresponding one or more network slice routing rules.

Optionally, each network slice routing rule further comprises a service scope at which the assignable network slide applies, wherein the service scope indicates any one of: a service, a service in a packet data network, PDN, and a service data flow in a PDN.

Optionally, the network slice routing rule further comprises data indicating one or more conditions and/or events specifying when a further network slice selection request should be transmitted to the PC_NSS.

Optionally, the method further comprises controlling, by the network slice selector, the transmitter to transmit to the AMF redirect data for redirecting assignment of the network slice for the UE to a further AMF, and determining, by the network slice selector, the redirect data based on whether the assignable network slice is supported by the AMF.

Optionally, the method further comprises determining, by the selection data manager, at least part of the selection data by controlling the transmitter to transmit one or more selection data requests to one or more further methods in the telecommunications network, and receiving, by the receiver, the selection data from the one or more further network nodes.

Optionally, the selection data further comprises: network slice data comprising one or more network slice attributes affecting network slice selection, the time of day and/or one or more network operator specified conditions.

According to an aspect of the invention, there is provided a computer program comprising instructions which, when executed on at least one processor, cause the at least one processor to carry out any method disclosed herein.

According to an aspect of the invention, there is provided a carrier containing the computer program mentioned above, wherein the carrier is one of an electronic signal, optical signal, radio signal, or non-transitory computer readable storage medium.

DETAILED DESCRIPTION

Methods and apparatus disclosed herein include mechanisms implemented in a core network node called Policy Control for Network Slice Selection function (PC_NSS) that extends the network slice selection functionality described in 3GPP.

In exemplary methods and apparatus, in order to decide about which network slice to assign to a UE, the PC_NSS may access up to date network slice parameters relating to a network slice for the service that the network slice is intended to deliver, the business purpose/customer that the network slice is serving, and/or the network slice status. Network slice parameters may comprise, for example, load within the network slice, current latency to deliver the intended service within the network slice, message loss within the network slice etc.

For example, a 60% load in a network slice for MBB services in an Enterprise Business purpose might qualify the network slice as "available" and the PC_NSS may therefore determine that the network slice can be assigned to the corresponding UE. Alternatively, given the same load for a low latency application, such as for a GamingX network user, the PC_NSS might qualify the network slice as "latency_risk" and determine that it may not be assigned to the corresponding UE.

To instruct a core network node about how to route access or PDU session establishment requests in a selected network slice, the PC_NSS may transmit to the requesting network function (e.g. an MMF/AMF or SMF) a Network Slice Routing Rule (NSRR).

A Network Slice Routing Rule may include one or more of the following per network slice:
 the network slice instance ID;
 the service scope at which the network slice applies (e.g. any service, any service in a Packet Data Network (PDN), a Service Data Flow in a PDN);
 the set of NFs (common and specific for the network slice) selected to route the UE request, e.g. a PDU session establishment request; and
 one or more network slice selection events that trigger a network slice reselection for each NF specified in the route above. For example, the NSRR may specify that, in the AMF, a request for network slice selection occurs at specific mobility events and/or PDN connection requests. In a further example, the NSRR may specify that the SMF should request network slice selection (for further UP NF selection) at reception of a PDN connection request. Other examples are possible.

For the sake of simplicity, any one of the AMF and MMF may be indistinctly referred to hereinafter to represent any one of them.

Exemplary methods and apparatus disclosed herein may be based on one or more of the following features:

The PC_NSS, at policy decision request from the AMF as part of the attach (or UE connectivity) procedure, and based on dynamic policies, may select network slice(s) that can be assigned to the UE at attach and at PDN connection establishment procedures. If the selected network slice for the attach procedure does not correspond with the one provided by the UE (the network slice(s) provided by the UE may be derived by the PC_NSS from the Network Slice Selection Assistance Information (NSSAI)), and the selected network slice does not comprise as NFs the AMF requesting policy decision, the AMF may redirect the UE to the proper network slice, and may return the determined NSSAI. The AMF may inform the UE about the new NSSAI.

When the selected network slice corresponds to the one derived by the NSSAI provided by the UE, or the requesting AMF is a network function included into the selected network slice(s), the PC_NSS may provide to the AMF at UE attach the information about the NSRR(s) (multiple NSRRs when the UE can simultaneously access to several slices).

At PDU session establishment, the AMF may select an applicable network slice assignable for the UE and may apply the correspondingly applicable NSRR and at service scope matching, it may either contact the PC_NSS (if NSRR defined events for AMF indicate to do so) or it may contact the SMF as indicated by the set of NFs in the NSRR. When forwarding the PDU session establishment to the SMF, the AMF may also include information about whether the SMF has to contact the PC_NSS upon PDU session establishment and may also include information about the UPF to be selected.

The SMF may contact the PC_NSS at PDU session establishment if the AMF indicated to do so. The PC_NSS may provide to the SMF information about the NSRR to be applied for that network slice to use at the service scope, e.g. service (data flow) procedures. This decision may be based on dynamic polices that consider different network and subscriber conditions. The PC_NSS may also provide additional information to the SMF that indicates under which conditions it needs to be triggered for network slice re-evaluation.

The SMF, the AMF, or the MMF may contact the PC_NSS at other events than attach/connectivity request or PDU session establishment (such as mobility, change of access type, service detection, etc.), if configured to do so within the NSRR. The PC_NSS may then select a different network slice and/or provide new NSRR(s). This enables use cases where an operator of the network applies a different network slice for different geographical areas, for different access networks or when a new service is activated for this PDN connection.

The PC_NSS may modify or revoke any of the previously provided NSRRs at any moment.

The PC_NSS can interface with an Analytics function, which is configured to provide the PC_NSS with analytics insights (for example, congested area, terminal malfunctioning, network slice conditions) to be considered in the network slice selection process. If a user starts a service that requires specific latency requirements and a network slice cannot meet them due to its network conditions, the PC_NSS can select a different network slice.

By implementing exemplary methods and apparatus disclosed herein, the network operator is able to implement new and complex use cases that depend on dynamic modification of the set of network slices that can be assigned alternatively or simultaneously to a UE. Moreover, methods and apparatus disclosed herein are enablers for the more dynamic creation and deployment of network slices, since that availability of a new network slice (or the removal of availability of an old network slice) for the UE can be simplified to the configuration of a network selection policy in the PC_NSS.

The PC_NSS, in order to make decisions about the network slice to select for a UE, may be configured to gather UE data from one or more of: a Subscription Database (for example, UE data such as subscribed services); an MMF (or AMF), i.e. MMF input information (for example, location of the UE, type of UE request originating from the UE (for example, attach or PDU session establishment) and a UE requested input); a fifth generation (5G) PCRF (for example, if the UE is using a detected service, for which the service data usage been surpassed by the UE); and an Analytics function (for example, high signalling load, bad Quality of Experience, QoE, (high latency) etc.).

The PC_NSS may alternatively or in addition access up to date network data about network slice attributes, such as the service that the network slice is intended to deliver, business purpose/customer that the network slice is serving, and the network slice status (for example, load on the network slice, current latency in the network slice to deliver the intended service and message loss within the network slice).

The PC_NSS may combine the collected UE data and/or network data with other parameters, such as time of day and other operator conditions, into selection data for network slice selection.

The selection data for network slice selection results in the determination of a network slice or a set of network slices alternately or simultaneously available for the UE for this request.

The PC_NSS may provide a selected network slice(s), i.e. one or more assignable network slice, and the PC_NSS may transmit for each network slice the corresponding NSRR, which includes the NFs (or a chain of selected NFs, for example, the SMF and UPF) to route the specific UE initiated procedure. The NSRR may also include one or more events and/or conditions that would trigger a new network slice selection request. The NSRR may also include the service scope at which the network slice applies.

if the selected network slice does not match the network slice the UE is on and it is not handled by an AMF, the AMF will reroute the corresponding procedure to the selected network slice. When the selected network slice does not match the network slice the UE is on and the selected network slice is handled by the AMF, the AMF will enforce the network slice information, i.e. the NSRR for the selected network slice.

In exemplary arrangements, if network slicing applies, the PC_NSS may only provide an assignable network slice and corresponding NSRR information to the AMF when the AMF is in charge of the assignable network slice. Otherwise, the PC_NSS may provide redirect information to the AMF for it to redirect the initial attach request to a further AMF via the RAN or via direct signalling between the initial AMF and the further AMF.

In exemplary arrangements, the PC_NSS may check (for example in step 514 of FIG. 5, described below) whether an NSSAI determined by the PC_NSS matches the NSSAI provided by the UE. If not and if the determined NSSAI is not supported by the AMF, the PC_NSS may provide redirect information instead of network slice information.

The NSRR includes network slice information to be delivered by the PC_NSS to the requesting NF (for example an MMF/AMF, or an SMF). The NSRR may include one or more of: the network slice instance ID to which it relates; the service scope at which the network slice applies to (for example, any service, any service in a PDN, a Service Data Flow in a PDN); the set of NFs forming the network slice (for example, common and specific to the slice) and through which to route the UE initiated procedure; and one or more selection events and/or conditions that trigger a network slice reselection (per NF, for example in the MMF, a rule may be installed to request network slice selection at PDN connection request, or in the SMF a rule may be installed to request network slice selection (for further UP selection) at reception of the PDN connection request).

Figure 3:
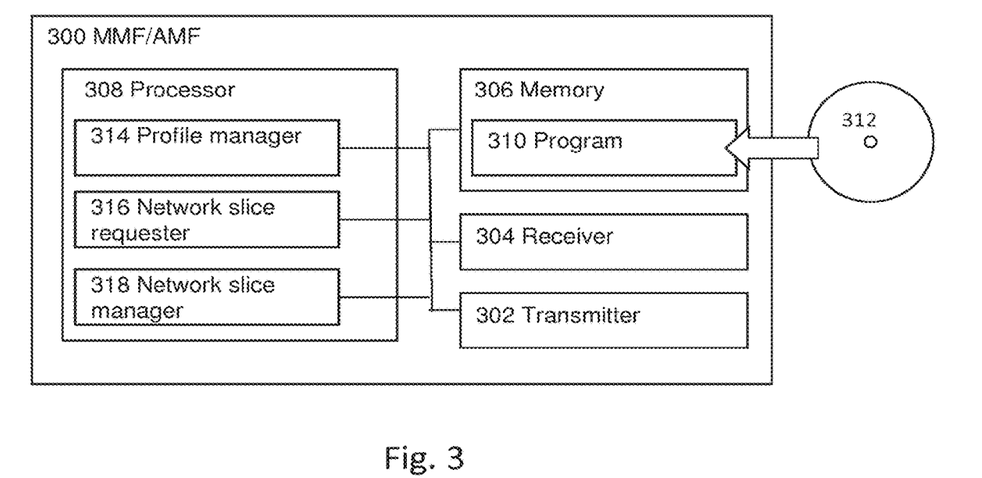
FIG. 3 is a block schematic representation of a network node implementing a Mobility Management Function or Access Mobility Management Function.

FIG. 3 shows a schematic representation of a network node for implementing an MMF/AMF 300. The MMF/AMF 300 may be an MMF/AMF 104 of FIG. 1. The MMF/AMF 300 comprises a transmitter 302 and a receiver 304. The transmitter 302 and receiver 304 may be in data communication with other network entities in a telecommunications network and are configured to transmit and receive data accordingly.

The MMF/AMF 300 further comprises a memory 306 and a processor 308. The memory 306 may comprise a non-volatile memory and/or a volatile memory. The memory 306 may have a computer program 310 stored therein. The computer program 310 may be configured to undertake the methods disclosed herein. The computer program 310 may be loaded in the memory 306 from a non-transitory computer readable medium 312, on which the computer program is stored. The processor 308 is configured to undertake one or more of the functions of a profile manager 314, a network slice requester 316 and a network slice manager 318, as set out below.

Each of the transmitter 302 and receiver 304, memory 306, processor 308, profile manager 314, network slice requester 316 and network slice manager 318 is in data communication with the other features 302, 304, 306, 308, 310, 314, 316, 318 of the MMF/AMF 300. The MMF/AMF 300 can be implemented as a combination of computer hardware and software. In particular, the profile manager 314, network slice requester 316 and network slice manager 318 may be implemented as software configured to run on the processor 308, or as combinations of hardware and software in separate modules. The memory 306 stores the various programs/executable files that are implemented by a processor 308, and also provides a storage unit for any required data. The programs/executable files stored in the memory 306, and implemented by the processor 308, can include the profile manager 314, network slice requester 316 and network slice manager 318, but are not limited to such.

Figure 4:
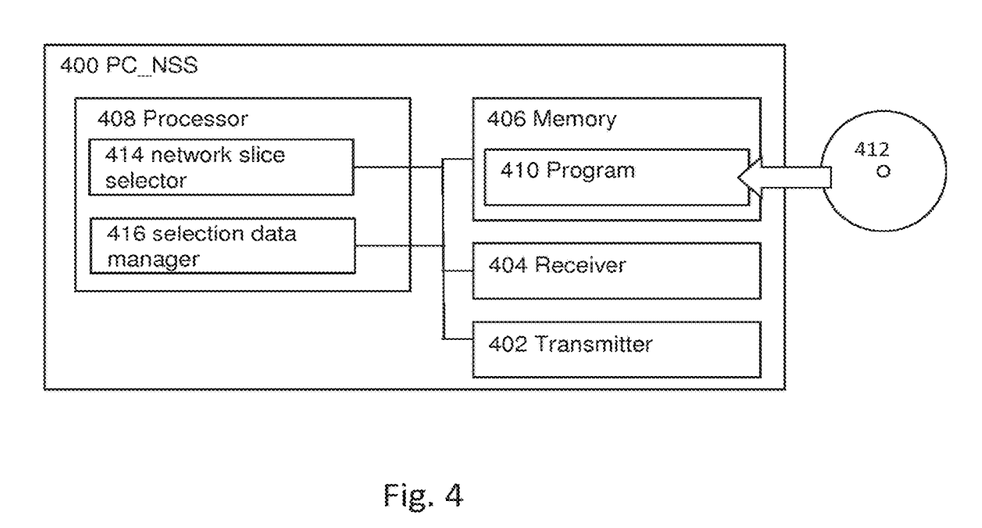
FIG. 4 is a block schematic representation of a network node implementing a Policy Control for Network Slice Selection function.

FIG. 4 shows a schematic representation of a network node for implementing a PC_NSS 400. The PC_NSS 400 may be a Policy Control Function, PCF, 108 controlling slice selection policies in an architecture of FIG. 1. The PC_NSS 400 comprises a transmitter 402 and a receiver 404. The transmitter 402 and receiver 404 may be in data communication with other network entities in a telecommunications network and are configured to transmit and receive data accordingly.

The PC_NSS 400 further comprises a memory 406 and a processor 408. The memory 406 may comprise a non-volatile memory and/or a volatile memory. The memory 406 may have a computer program 410 stored therein. The computer program 410 may be configured to undertake the methods disclosed herein. The computer program 410 may be loaded in the memory 406 from a non-transitory computer readable medium 412, on which the computer program is stored. The processor 408 is configured to undertake one or more of the functions of a network slice selector 414 and a selection data manager 416, as set out below.

Each of the transmitter 402 and receiver 404, memory 406, processor 408, network slice selector 414 and selection data manager 416 is in data communication with the other features 402, 404, 406, 408, 410, 414, 416 of the PC_NSS 400. The PC_NSS 400 can be implemented as a combination of computer hardware and software. In particular, the network slice selector 414 and selection data manager 416 may be implemented as software configured to run on the processor 408, or as combinations of hardware and software in separate modules. The memory 406 stores the various programs/executable files that are implemented by a processor 408, and also provides a storage unit for any required data. The programs/executable files stored in the memory 406, and implemented by the processor 408, can include the network slice selector 414 and selection data manager 416, but are not limited to such.

Figure 5:
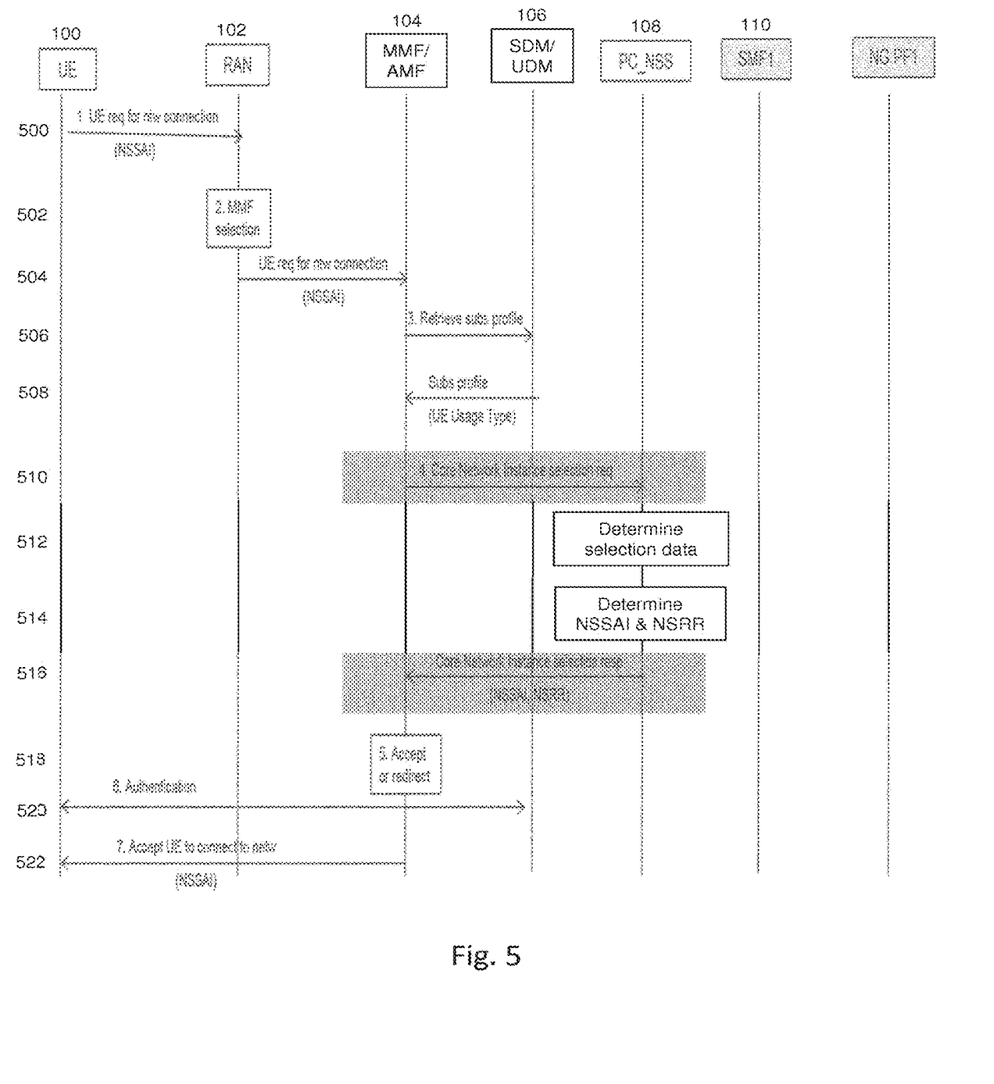
FIG. 5 is a signalling diagram showing a method for network slice selection.

FIG. 5 is a signalling diagram showing an exemplary method for determining a network slice for a UE. An exemplary signalling flow will be described with reference to FIGS. 1, 3, 4 and 5.

500: The UE 100 transmits a UE request, in this case a registration request such as a request for connectivity, to the Radio Access Network (RAN) 102. In an exemplary arrangement, the UE 100 may transmit along with the UE request, data providing information to the network for selecting a network slice. For example, the UE 100 may transmit Network Slice Selection Assistance Information (NSSAI).

502: The RAN 102 receives the request from the UE 100 and determines a Core Network instance for the UE 100 based on information provided in the request. In an exemplary arrangement, the RAN 102 selects the Core Network instance based on the NSSAI provided by the UE 100 in the request. If the UE 100 does not provide any NSSAI, the RAN 102 may select a default CN instance.

504: The RAN 102 forwards the UE request for connectivity to the AMF 104 of the selected CN instance, including the NSSAI when provided by the UE 100.

506: The receiver 304 of the AMF 104 receives the UE request from the RAN 102. In an exemplary arrangement, the profile manager 314 controls the transmitter 302 to transmit to a Subscriber Data Management (SDM) 106 function a profile request for a subscriber profile relating to the user of the UE 100.

508: In this exemplary arrangement, the SDM 106, in response to receiving the profile request, transmits a subscription profile to the AMF 104. The subscription profile includes a usage type for the UE 100.

510: The AMF 104 may use the retrieved subscription profile from the SDM 106 in combination with the NSSAI provided by the UE 100 to statically determine a selected network slice to assign to the UE 100. Alternatively, e.g. if static information is not enough, the network slice requester 316 of the AMF 104 controls the transmitter 302 to transmit a network slice selection request to the PC_NSS 108.

If local information stored on the AMF 104 indicates that the AMF 104 belongs to a deployed solution where dynamic slice selection is supported, the AMF 104 may transmit the network slice selection request to the PC_NSS 108 for one or more authorized network slices that may be assigned to the UE 100.

512: The receiver 404 of the PC_NSS 108 receives the network slice selection request and the network slice selector 414 selects one or more network slices that are assignable to the UE 100 based on selection data, which may comprise UE data and/or network data.

The UE data may comprise UE specific parameters affecting network slice selection. In exemplary arrangements, the selection data is determined by the selection data manager 416 of the PC_NSS 108. The selection data manager 416 may control the transmitter 402 to transmit one or more UE data requests to one or more network nodes. The UE data requests may request UE data from any one of: the SDM 106 (e.g. UE data such as subscribed services for the user of the UE); and an analytics system (e.g. UE data such as high signaling load, bad QoE (high latency)). UE data may also be retrieved by the selection data manager 416 from data received by the AMF 104 without the need to request it (e.g. UE data such as UE location, type of UE request (e.g. attach, PDU session establishment) and UE requested input).

The selection data manager 416 may also obtain network data, as discussed above.

514: Based on the selection data, which may include the UE data (requested or otherwise received), the network data and/or one or more other conditions (e.g. time of day or other operator conditions), the network slice selector 414 of the PC_NSS 108 determines network slice data, which may be an authorized NSSAI, for the UE 100. If the NSSAI provided by the AMF 104 in the network slice request, e.g. a UE-provided NSSAI, is valid, the PC_NSS 108 may also select one or more network slices for the UE based on the selection data. The network slice selector 414 determines network slice routing data, which may be a NSRR, for each of the selected network slices.

516: The transmitter 402 of the PC_NSS 108 transmits to the AMF 104 the authorized NSSAI and the NSRR(s). Each NSRR may comprise one or more of the following: the network slice instance ID to which it relates; the set of NFs forming the network slice and through which to route a UE request; the selection conditions and/or events that may trigger a request for network slice selection to the PC_NSS 108 by each of the network functions specified in the route above. In exemplary arrangements, the list of events may specify that the AMF 104 should send a network slice request to the PC_NSS 108 upon specific mobility events or upon PDN session establishment, or may for example specify that the SMF 110 should contact the PC_NSS 108 upon detection of a specific service data flow; and the service scope at which the network slice applies, such as for instance, any service, any service in a PDN, a Service Data Flow in a PDN, etc.

If the NSSAI provided by the AMF 104, e.g. the UE-provided NSSAI, in the network slice request is not valid, the NSSAI determiner 418 of the PC_NSS 108 rejects the current slice selection and transmits to the AMF 104 the authorized NSSAI.

518: The receiver 304 of the AMF 104 receives the authorized NSSAI and NSRR(s) from the PC_NSS 108 and the network slice manager 318 controls the assignment of network slices to the UE based thereon. That is, the AMF 104 enforces the decision from the PCC_NSS 108 with regards to network slice selection.

If the authorized NSSAI received from the PC_NSS 108 matches the NSSAI provided by the UE 100, the network slice manager 318 is able to assign the UE-provided network slice for the UE 100 and enforces the applicable NSRR received from the PC_NSS 108

If the authorized NSSAI does not match the NSSAI provided by the UE, the network slice manager 318 determines whether the authorized NSSAI is supported at the AMF 104 and, if not, controls the transmitter 302 to transmit the UE request toward another AMF If the authorized NSSAI does not match the UE-provided NSSAI and the network slice manager 318 determines that the authorized NSSAI is supported at the AMF 104, the network slice manager 318 is able to assign the PC_NSS 108 selected network slice to the UE 100 based on the authorized NSSAI and NSRR 520: The authentication process for the UE 100 may now be executed, according to conventional procedures. Note that in case of UE redirection to the authorized NSSAI, the authentication process may not be executed.

522: In the example of FIG. 5, the connectivity request is accepted after successful authentication. In an embodiment, the AMF 104 may provide the UE 100 with updated NSSAI information, i.e. the authorized NSSAI, if the PC_NSS 108 selected network slice has been assigned to the UE 100.

In certain exemplary arrangements, the network slice selector 414 of the PC_NSS 108 may check in step 514, for example, whether the determined NSSAI matches the NSSAI provided by the UE 100. If not, and the determined NSSAI is not supported by the AMF 104, the network slice selector 414 may transmit redirect information to the AMF 104 instead of the NSSAI and NSRR. In that case the AMF 104 redirects the UE request towards a further AMF based on the redirect information received from the PC_NSS 108. The redirect can be done via the RAN 102 or via direct signalling towards the further AMF.

Figure 6:
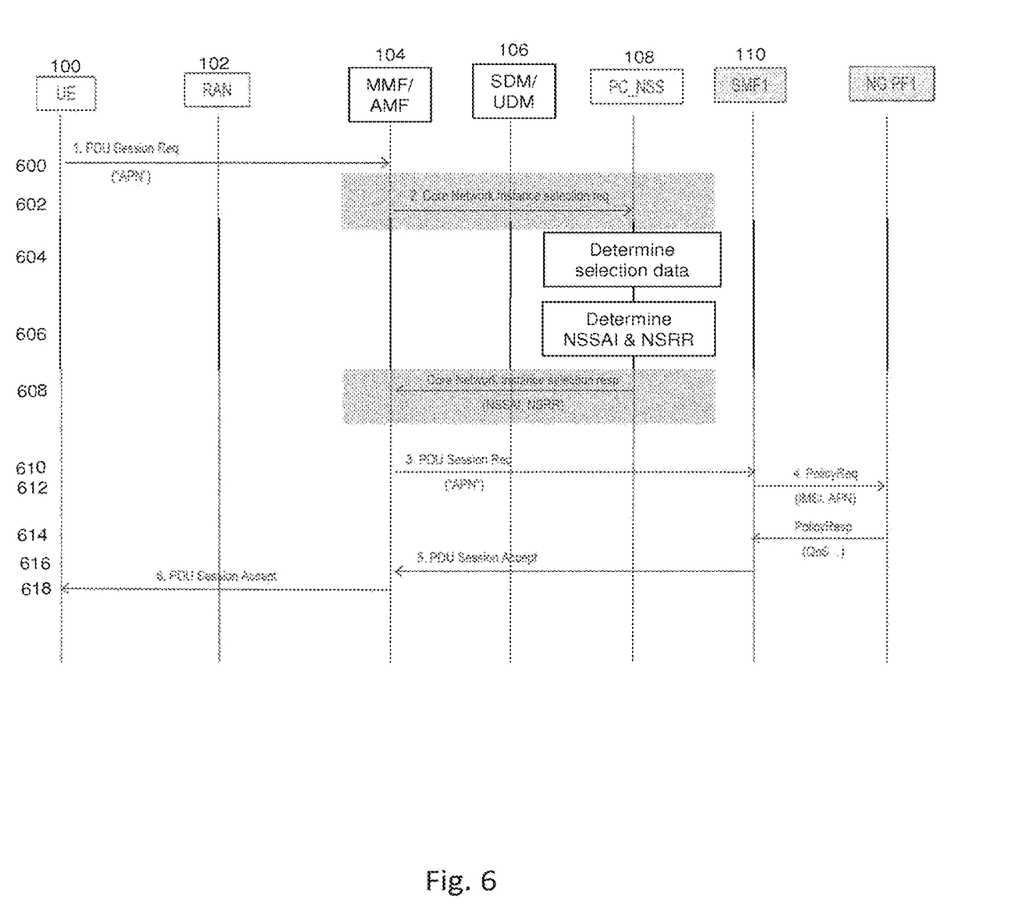
FIG. 6 is a signalling diagram showing a method for network slice selection.

Once the network grants connectivity for the UE 100, PDU sessions may be established with the network so that the UE can utilise subscribed services. FIG. 6 shows a signalling diagram for an exemplary PDU session establishment.

600: The UE 100 transmits to the AMF 104 a UE request, in this case a request for the establishment of a PDU Session. The UE request comprises data identifying the network for which the PDU session is requested (e.g. APN).

602: The receiver 304 receives the UE request (in this case a PDU Session establishment request). The network slice manager 318 retrieves the selected network slice for the UE 100, as selected by the PC_NSS 108. The network slice manager 318 determines the corresponding NSRR and any conditions and/or events included in the NSRR received from the PC_NSS 108 during the connectivity procedure for the UE 100 (see FIG. 5). The network slice manager 318 then determines whether any of the conditions and/or events indicated in the corresponding NSRR has occurred.

If not, the network slice manager 318 controls the transmitter 302 to transmit the PDU session establishment request towards the SMF 110 indicated by the corresponding NSRR, as described in 610 below.

If one of the conditions and/or events has occurred, the network slice manager 318 controls the transmitter 302 to transmit a network slice selection request to the PC_NSS 108. The network slice selection request includes data relating to the PDU session establishment request, such as PDN Identification data.

604: The receiver 404 of the PC_NSS 108 receives the network slice selection request and the network slice selector 414 selects, based on the selection data and the data relating to the PDU session establishment request, one or more network slices that may be assigned to the UE 100. This may be done using the selection data manager in a similar way to that described above in respect of FIG. 5.

606: The network slice selector 414 determines an authorized NSSAI for the one or more authorized network slices and one or more corresponding NSRRs, as set out above.

608: The network slice selector 414 controls the transmitter 402 to transmit towards the AMF 104, the authorized NSSAI and the one or more NSRRs.

610: The network slice manager 318 of the AMF 104 enforces the authorized NSSAI and corresponding NSRR(s) received from the PCC_NSS 108. This may be done as follows.

If the network slice manager 318 determines that the received NSSAI is supported by the AMF 104, it controls the transmitter 302 to transmit the PDU session establishment request towards the SMF 110 indicated by the corresponding NSRR.

If the network slice manager 318 determines that the received NSSAI is not supported by the AMF 104, it controls the transmitter 302 to transmit the PDU session establishment request toward another AMF for control of network slice assignment.

If the network slice manager 318 determines that the received NSSAI does not match the NSSAI selected during the attach procedure, it controls the transmitter 302 to transmit to the UE 100 updated NSSAI information.

In the case that the PDU session establishment request is to be handled by the AMF 104, the network slice manager 316 controls the transmitter to transmit the PDU session establishment request to the SMF 110 instance indicated by the applicable NSRR, and may convey also information about the User Plane Function (UPF) to select.

The AMF 104 may also forward to the SMF 110 data identifying the events and/or conditions that would trigger a network slice reselection, which are included in the NSRR (s). For example, if the NSRR indicates network slice reselection at service data flow detection, the AMF 104 may forward this data to the SMF 110. The SMF 110 then, at the reception of the PDU Session establishment request, may query the PC_NSS 108 for network slice selection. At request from the SMF 110, the PC_NSS 108 could install the conditions for a service data flow to be routed via one network slice (UP) or another. (This step is not shown in the flow).

612: The SMF 110 transmits a query to the NG Policy Function (NG PF) to obtain policy decisions applicable to the PDU session regarding QoS applicable to the session, charging applicable to the session. The NG PF transmits a response including the policy decisions for the session. In particular, the NG PF might be implemented in the same network node as the PC_NSS or in a different network node.

614: The SMF 110 receives the policy decisions from the NG PF and, once the PDU session is authorized by the NG PF, the SMF 110 transmits to the AMF 104 a notification that it accepts the PDU session establishment request.

616: The AMF 104 receives the notification and transmits to the UE 100 a corresponding notification accepting the PDU session establishment request.

Exemplary methods and apparatus disclosed herein propose a mechanism implemented in a core network node for use as a PC_NSS that extends network slice selection functionality so that:

To decide about the network slice to assign to a UE 100, the PC_NSS 108 accesses to up to date network slice information about applicable attributes, such as the service that the network slice is intended to deliver, the business purpose/customer that the network slice is serving, and the network slice status (e.g. load, current latency to deliver the intended service, message loss etc.).

To instruct the core network node about how to route access or PDU session establishment requests in a selected network slice, the PC_NSS returns to the requesting network function (AMF/MMF 104, SMF 110) a NSRR, containing.

the network slice instance ID to which it relates, the service scope at which the network slice applies (any service, any service in a PDN, a Service Data Flow in a PDN), the set of NFs (common and specific for the slice) to route PDU session establishment requests, and the events that trigger a Network Slice reselection per NF specified in the route above. For example, in the AMF 104 it can be installed a rule to request network slice selection at PDN connection request, or in the SMF 110 it can be installed a rule to request network slice selection (for further UP specific NF selection) at reception of the PDN connection request, etc The mechanism is based on:

PC_NSS, at Policy decision request from the AMF, and based on dynamic policies, may decide the authorized Network Slice that can be assigned for the UE at attach. If the authorized Network Slice does not correspond with the one provided by the UE (the network slice(s) provided by the UE is derived by the PC_NSS from the Network Slice Selection Assistance Information (NSSAI) provided by the UE), and the authorized network slice does not comprise, as NFs, the AMF requesting policy decision, the PC_NSS may indicate the AMF that the UE is redirected to the proper Network Slice, and may provide the authorized NSSAI. The AMF may inform the UE about the authorized NSSAI.

When the authorized Network Slice corresponds to the one derived from the NSSAI provided by the UE, or the requesting AMF is a network function included into the authorized network slice(s), the PC_NSS can provide to the AMF at UE attach the information about the NSRR(s) (multiple NSRRs when the UE can simultaneously attach to several slices).

At PDU session establishment, the AMF may apply the NSRR(s) and at service scope matching, it may either contact the PC_NSS (if NSRR defined conditions and/or events for AMF to do so) or it may contact the SMF as indicated by the set of NFs in the NSRR. When forwarding the PDU session establishment to the SMF, the AMF may also include information about whether the SMF has to contact the PC_NSS upon PDU session establishment.

The SMF may contact the PC_NSS at PDU session establishment if the AMF indicated so. The PC_NSS can provide to the SMF information about the NSRR to be applied for that network slice to use at service (data flow) procedures. This decision may be based on dynamic polices that consider different network and subscriber conditions. The PC_NSS can also provide additional information to the SMF that indicates under which conditions a network slice reselection needs to be triggered for.

The SMF or the AMF may contact the PC_NSS at other events than attach/connectivity request or PDU session establishment (such as mobility, change of access type, service detection, etc.), if configured to do so within the NSRR. The PC_NSS may then select a different network slice and/or provide a new NSRR. This enables use cases where the operator applies a different network slice for different geographical areas, for different access networks or when a new service is activated for this PDN connection.

The PC_NSS can modify or revoke any of the previously provided NSRR at any moment.

The PC_NSS can interface the Analytics function, and react at Analytics insights (as e.g. congested area, terminal malfunctioning . . . ). The PC_NSS can interface with an Analytics function that provide the PC_NSS with analytics insights (e.g. network slice conditions) to be considered in the network slice selection process. If a user starts a service that requires specific latency requirements and a network slice cannot meet them due to its network conditions, the PC_NSS can select a different network slice.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. A method for selecting one or more network slices assignable for a user equipment (UE) within a telecommunication network, the method comprising:
   receiving a network slice selection request from a first Access and Mobility Management Function (AMF), the network slice selection request comprising UE location and UE requested information;
   obtaining, from an analytics function network, slices conditions including network slices load conditions;

selecting, based on the network slice selection request comprising the UE location and the UE requested information, and the network slices conditions, one or more network slices assignable for the UE; and transmitting, to the first AMF, the one or more network slices assignable for the UE and information indicating redirection of the UE to a second AMF supporting the one or more network slices assignable for the UE.

2. The method of claim 1, wherein the UE requested information comprises one or more network slices requested by the UE.

3. The method of claim 1, wherein the method further comprises obtaining, from the analytics function, quality of experience information.

4. The method of claim 1, wherein the network slice selection request further comprises UE subscription data.

5. The method of claim 1, wherein the method further comprises transmitting information to the first AMF indicating a set of Network Functions (NFs) forming the one or more network slices assignable for the UE.

6. A node comprising:
one or more processors; and
a memory comprising instructions which, when executed by the one or more processors, causes the node to:
receive a network slice selection request from a first Access and Mobility Management Function (AMF), the network slice selection request comprising UE location and UE requested information;
obtain, from an analytics function, network slices conditions including network slices load conditions;
select based on the network slice selection request comprising the UE location and the UE requested information, and the network slices conditions one or more network slices assignable for the UE; and
transmit to the first AMF the one or more network slices assignable for the UE and information indicating redirection of the UE to a second AMF that supports the one or more network slices assignable for the UE.

7. The node of claim 6, wherein the UE requested information comprises one or more network slices requested by the UE.

8. The node of claim 6, wherein the instructions, when executed by the one or more processors, further cause the node to obtain, from the analytics function, quality of experience information.

9. The node of claim 6, wherein the network slice selection request further comprises UE subscription data.

10. The node of claim 6, wherein the instructions, when executed by the one or more processors, further cause the node to transmit to the first AMF information indicating a set of Network Functions (NFs) forming the one or more network slices assignable for the UE.

* * * * *